United States Patent [19]
Frach et al.

[11] 3,908,330
[45] Sept. 30, 1975

[54] SECURING MEANS FOR FASTENING STRUCTURAL ATTACHMENTS TO HOLLOW METAL OR PLASTIC SHAPED PARTS

[76] Inventors: Werner Frach, Friedenstrasse 16, 858 Bayreuth; Bernhard Janke, Hirtenackerstrasse 10, 8581 Bindlach, both of Germany

[22] Filed: June 11, 1974

[21] Appl. No.: 478,280

[30] Foreign Application Priority Data
June 18, 1973 Germany............................ 2330897
May 3, 1974 Germany............................ 2421587

[52] U.S. Cl. ............................. 52/758 F; 403/348
[51] Int. Cl.² ........................................ F16D 39/00
[58] Field of Search .................. 52/758 F, 710, 711; 403/348; 151/41.75, 41.76, 41.71; 85/1 H

[56] References Cited
UNITED STATES PATENTS
| | | | |
|---|---|---|---|
| 1,820,667 | 8/1931 | Leyes............................ | 85/1 H |
| 2,809,726 | 10/1957 | Farquhar et al................... | 52/758 F |
| 2,945,704 | 7/1960 | Korn................................. | 151/41.71 |
| 3,507,315 | 4/1970 | Tummarello..................... | 52/710 X |
| 3,589,525 | 6/1971 | Allen.............................. | 403/348 X |

*Primary Examiner*—Andrew V. Kundrat
*Attorney, Agent, or Firm*—Owen, Wickersham & Erickson

[57] ABSTRACT

Structural attachments are secured to frames of doors or windows by a combination of (1) generally rectangular clamping members that are narrow enough in width to fit in an aperture slot that leads to an undercut groove in the frame and (2) fasteners that extend through the attachment and can be locked to the clamping members for relative rotation until a predetermined moment is exceeded. The fasteners can thus be used to rotate the clamping members 90° into a position where the fasteners engage undercut walls and thereby clamp the attachment to the frame.

9 Claims, 13 Drawing Figures

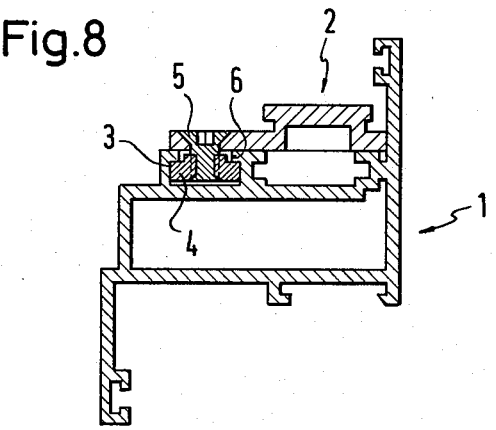
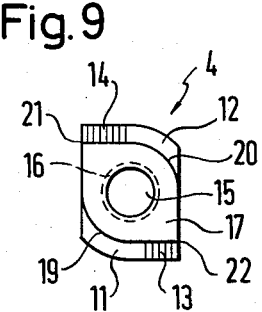
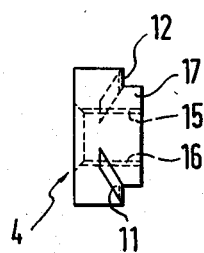
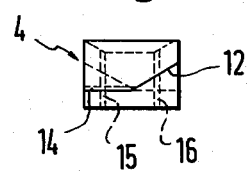
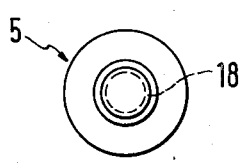
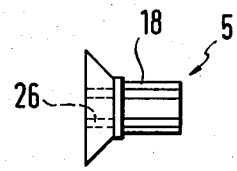

SECURING MEANS FOR FASTENING STRUCTURAL ATTACHMENTS TO HOLLOW METAL OR PLASTIC SHAPED PARTS

BACKGROUND OF THE INVENTION

The invention relates to securing means for fastening structural attachments to hollow shaped parts of metal or plastic, particularly for door and window frames, with undercut slots. The securing means comprises (1) clamping members inserted into the slots and arranged to engage the undercut walls, the clamping members being narrower than the narrow slot portion between the undercut walls and shorter than the full width of the slot portion beneath the undercut walls and (2) fastening means for connecting the structural attachments to the clamping members, the fasteners being rotatable relative to the structural attachments through which they extend.

Securing means of this general type are known. In these known securing means, the fasteners are tightening screws which are screwed into threaded openings in the clamping members. The undercut slots are formed by undercutting grooves. The assembly proceeds as follows: First, the clamping members by themselves, that is, while separate from the attachments which are to be secured, are aligned so that they extend longitudinally of the groove. In this position, they are inserted into the groove. They are thereupon rotated 90° into their locking position. In order to prevent the clamping members from inadvertently shifting in the undercut groove after they have been rotated, they are chamfered to provide a wedge shape. When rotated, the wedge surfaces are urged against the undercut walls of the groove and thus arrest the clamping members. The structural attachments are then placed on the frame opposite the seated clamping members, and the tightening screws are then inserted through holes in the attachments and screwed into the threaded openings of the clamping members. The attachments are thereupon secured by turning the tightening screws.

This manner of securing structural attachments is expensive and time-consuming, particularly because special care must be taken to locate the holes in the attachments exactly above the threaded openings of the clamping members. However, when the attachments are being aligned, they block the view of the clamping members that are seated in the undercut groove so that substantial time is consumed in alignment.

An object of the invention therefore is to improve the elements of the above-described securing means in such a way that assembly becomes considerably simpler and time-saving.

SUMMARY OF THE INVENTION

Starting from the above-described parts, the above-mentioned object is solved in accordance with the invention by connecting the clamping members to the fasteners and then securely holding them together against relative rotation, at least to the extent that rotation of the fasteners insures rotation of the clamping members in the undercut chamber from their introductory position to their locking position; at the same time, the attachments with the clamping members secured to them by the fasteners, form an assembly unit which is secured as a whole to the shaped frame.

Assembly has been simplified by the securing means of the present invention; it proceeds as follows: The clamping members are aligned on the structural attachment by suitably rotating the fasteners so that the clamping members assume their introductory position. The attachment is then mounted on the frame so that the clamping members enter the undercut slot. The clamping members can then be brought into their locking position by rotating the fasteners. The advantage of securing means in accordance with the invention becomes the more apparent the greater the number of clamping members per attachment. With the previously known securing means it was difficult even to align the clamping members accurately with the attachment, so as to coincide with the spacing between the holes through the attachment and to maintain the spacing until the parts have been screwed fast; with the present invention spacing does not play a role in the securing means, since the clamping members are connected with the attachments prior to assembly.

As already mentioned, the fasteners of the previously known securing means are tightening screws screwed into the tapped openings of the clamping members. By tightening the screws, the clamping members are pulled up toward the undercut walls of the slot, and a fixed connection is thereby ensured. However, the screwed connection between the tightening screws and the clamping members has the disadvantage that, with a prefabricated assembly unit of the type described above, there is no guarantee that, when the screws are rotated for moving the clamping members into their locking position, the clamping members are securely entrained in the groove in every instance. If, for example, the clamping members encountered frictional resistance on the bottom of the groove or on the undercut surfaces, this secure entrainment is not guaranteed. Additional measures are therefore required which will safeguard entrainment within the meaning of the abovestated general concept of the solution to the problem.

A practical possibility provided by the present invention comprises having the thread of the tapped openings cut in a portion only of the bore depth.

This measure has the effect that the tensioning screws, when screwed into the tapped openings, encounter resistance when they reach the portion into which no thread has been cut. Rotation of the tensioning screws therefore leads to entrainment of the clamping means even in the presence of frictional resistance. If it is desired to rotate the screws past the locking position, an increased torsional moment must be employed. Under the effect of this increased torsional moment, the screw itself will then cut its thread through the remaining portion of the through opening. By further rotating the screw, the desired effect is then achieved, namely, that the clamping members are pulled toward the undercut walls.

Another practical possibility comprises deforming the thread of the tensioning screws and/or the thread of the tapped openings at least in one place, assuming in this instance that the thread is cut through the entire depth of the through openings. Deformation may be achieved, for example, by a blow with a punch on the side of the clamping members facing away from the attachment, on the rim of the through openings.

The two above-mentioned practical possibilities enable the clamping members to be entrained again when the tensioning screws are turned back, after effecting release from the groove undercuts, and to be rotated into their initial position, so that the attachment may thus again be detached from the frame.

In order to ensure that as little friction as possible occurs during tensioning of the clamping members between the threaded end of the tensioning screws and the groove bottom, it is proposed, in accordance with a further development of the invention, to provide the screws with a projecting tip at the threaded end.

A further possibility which still more definitely departs from the previously known securing means comprises an assembly in which the fasteners are no longer connected to the clamping members by a thread-type connection, but instead the fasteners have a non-circular shape and are inserted into correspondingly shaped holes in the clamping members. For example, the fasteners may be pins provided with longitudinal ribs, and the holes in the clamping members may be provided with suitable lateral groove-like recesses. The fasteners and clamping members are then, as a practical matter, riveted together at the insert end of the fasteners.

Further embodiments of the invention are described and are set forth in dependent claims.

BRIEF DESCRIPTION OF THE DRAWINGS

In the drawings:

FIG. 8 is a view similar to FIG. 1 of a modified form of the invention having both a different type of clamping member and a different type of fastener.

FIG. 9 is a top plan view, enlarged in scale, of the clamping member used in FIG. 8.

FIG. 10 is a view in side elevation of the clamping member of FIG. 10.

FIG. 11 is a view in end elevation of the clamping member of FIGS. 9 and 10.

FIG. 12 is a top plan view of the fastener used in FIG. 8.

FIG. 13 is a view in elevation of the fastener of FIG. 12.

DESCRIPTION OF SOME PREFERRED EMBODIMENTS

Figure 1:
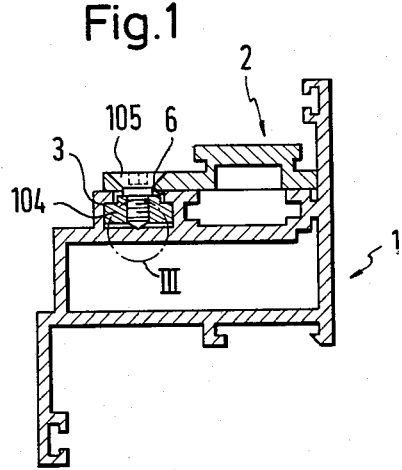
FIG. 1 is a view in section through one side of a metal frame of a window, with a structural attachment secured thereto by employing one embodiment of the principles of the present invention comprising a clamping member and a fastener.

In the description of the figures hereinbelow, the identical parts have been allotted identical reference numerals.

FIG. 1 shows a portion of one side of a metal frame 1 of a window. This frame 1 is provided with an undercut slot 3 having an aperture slot 6. On the frame 1, a structural attachment 2 is secured; in the present instance the attachment 2 comprises a part of a member that goes around a corner of the frame. For securing purposes, a clamp nut 104 is provided and is rotatably secured relatively to the fitting 2 by a fastener lug 105, here in the form of a tensioning screw.

Figure 7:
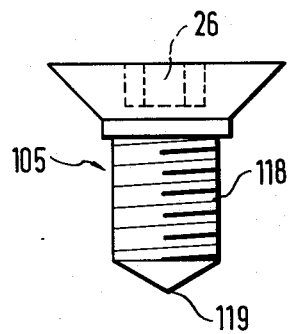
FIG. 7 is a view in elevation of a fastener which may be employed with the clamping member shown in FIG. 1, as well as with that shown in FIGS. 4 to 6.

The tensioning screw 105 is shown in FIG. 7. It has a thread 118 and a conical tip 119. Its head includes a hexagonal depression 26 into which a tool may be inserted for rotating it. It may be, in other words, an Allen-head screw.

Figure 4:
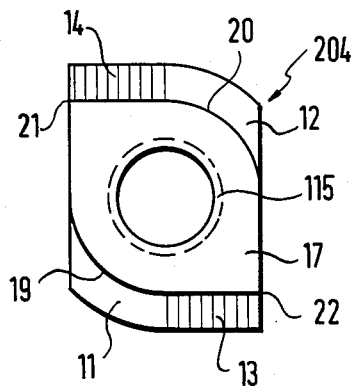
FIG. 4 is a top plan view of a modified form of clamping member also used in embodiments of the invention.
Figure 5:
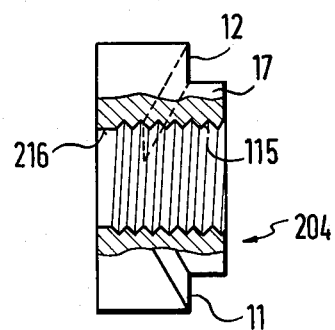
FIG. 5 is a view in side elevation and partly in section of the clamping member of FIG. 4.
Figure 6:
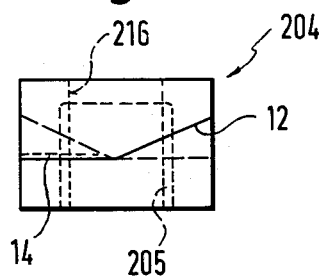
FIG. 6 is a view in end elevation of the clamping member of FIGS. 5 and 6.

The clamp nut 104 is almost identical in structure to the clamp nut 204 shown in FIGS. 4 to 6. The sole difference is that the thread 115 of the clamp nut 104 extends all the way through the through opening, while the clamp nut 204 has a through opening with an unthreaded portion 216 at the bottom. The clamp nuts 104 and 204 are of substantially rectangular shape, two opposite sides of the rectangle being rounded off to facilitate rotation. On the two narrower sides of the rectangle, ramps 11,12 are provided which rise upwardly from the rounded-off corner. The upper portion of each ramp is provided with a corrugation 13,14. The length of the clamp nut, as measured between the outer edges of the ramps 11,12, which is also the width across the narrow sides of the rectangle, is substantially equal to (but slightly narrower than) the width of the wide portion of groove 3 in the frame 1, underneath the undercut walls. The width, as measured between the broad sides of the rectangle, is substantially equal to (but slightly narrower than) the width of the aperture slot 6 above the undercut portion of the groove 3.

A shoulder 17 lies between the two ramps 11 and 12; it has a substantially quadrangular cross section, two opposite corners 19 and 20 being rounded off. The diagonal measured between the two remaining corners 21 and 22 is larger than the width of the aperture slot 6.

Figure 2:
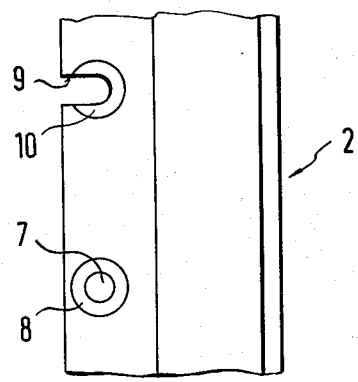
FIG. 2 is a top plan view of a portion of the structural attachment.

A portion of the attachment 2 is shown in FIG. 2. Holes 7 with a depression or countersink 8 may be provided for anchoring the tensioning screw 105. However, it is also possible to provide a slot 9 with a depression or countersink 10. In the latter case, the tensioning screw 105 can be screwed to the clamp nut 104 prior to insertion of the screw 105 into the attachment 2.

Figure 3:
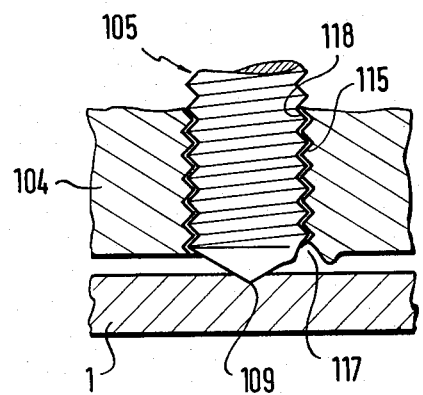
FIG. 3 is an enlarged view in section of a portion of FIG. 1, approximately that enclosed by the dotted circle.

As already mentioned, the clamp nut 104 has a through opening which is provided with a thread 115 that extends all the way through it. In order to ensure entrainment of the clamp nut 104 during rotation of the tensioning screw 105, at least until a specific torsional moment has been exceeded, the thread 115 has been deformed at 117, as shown in FIG. 3. Such deformation may be done simply by puncturing the connecting zone between the outer thread 118 of the tensioning screw 105 and the inner thread 115 of the through opening with a punch.

Entrainment of the clamp nut 204 in accordance with FIGS. 4 to 6 up to a specific torsional moment is ensured in that the through opening is unthreaded in an end portion 216. In this case, the tensioning screw 105 must cut its own thread after having exceeded the above-mentioned torsional moment.

For purposes of assembly, the clamp nuts 104 or 204 are first joined to the attachment 2 with the tensioning screws 105, the torsional moment between the screws 105 and the clamp nuts 104 or 204 at this stage not being in excess of the abovementioned limit. The screws 105 are then rotated so that the clamp nuts 104 or 204 align themselves longitudinally of the groove 3. The clamp nuts 104 or 204 are thereupon lowered into the groove 3. The screws 105 are then again rotated until the clamp nuts 104 or 204 assume their locking position in the groove 3. After rotation of 90°, they cannot be turned further. The screws 105 can now be screwed further into the clamp nuts 104 or 204 by employing a torsional moment which exceeds the predetermined limit. Simultaneously, they pull the clamp nuts toward the undercut walls of the groove 3 and arrest the fitting 2 against the frame part 1. The tip 119 bores into the frame 1 at the bottom of the groove; friction between the tip 119 and the groove bottom is relatively slight. The ramps 11,12 and the corrugations 13,14 favor the arresting and clamping effect of the clamp nut 104,204 during the rotation and tightening of the screw 105.

In the embodiment illustrated in FIGS. 8 to 13, a clamp member 4 is employed which is not tapped. A bore 15 is provided in the clamp member 4, with lateral grooves extending axially of the bore and distributed around the circumference of the bore. This is indicated by the circle 16 drawn in broken lines. The fastener 5 also is not threaded, but has lateral ribs 18 which fit into the grooves 16. The ribs 18 and the grooves 16 ensure torsion-free connection. An assembly unit is prepared in advance by riveting the clamp members 4 to the attachment 2 by the fastener 5, as shown in FIG. 8.

Clamping is provided here substantially by the effect of the ramps 11,12 and the corrugations 13,14 during rotation of the clamping members 4. The riveted connection ensures that the ramps 11,12 and the corrugations 13,14, when rotated, engage the undercut walls of the groove.

For the rest, assembly is carried out in the same manner as described in connection with FIGS. 1 to 7.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. Securing means for securing structural attachments to shaped parts of metal or plastic, particularly shaped frames of doors or windows having undercut slots providing undercut walls spaced apart by an aperture slot, comprising:

clamping members whose length is greater than their width, inserted into said slots and engaging under surfaces of said undercut walls, said clamping members being narrower in width than said aperture slot and shorter in length than the undercut portion of said slots, and fasteners for connecting said attachments and said clamping members, said fasteners being rotatably anchored to said attachments, said fasteners being tensioning screws screwed into tapped through openings of said clamping members said securing means being characterized in that a portion of said through opening is unthreaded, said clamping members being sufficiently connected with said fasteners as to prevent rotation relatively to each other at least to the extent that, when said fasteners are rotated, said clamping members rotate in said undercut slot from an initial position and a locking position is ensured, whereby said attachments and said clamping means secured to them by said fasteners form an assembly unit which is secured as a whole on said shaped parts.

2. Securing means in accordance with claim 1 wherein said tensioning screws are provided with a tip extending beyond the thread.

3. Securing means for securing structural attachments to shaped parts of metal or plastic, particularly shaped frames of doors or windows having undercut slots providing undercut walls spaced apart by an aperture slot, comprising:

clamping members whose length is greater than their width, inserted into said slots and engaging under surfaces of said undercut walls, said clamping members being narrower in width than said aperture slot and shorter in length than the undercut portion of said slots, and fasteners for connecting said attachments and said clamping members, said fasteners being rotatably anchored to said attachments, said fasteners being tensioning screws screwed into tapped through openings of said clamping member, said securing means being characterized in that the thread attaching such members is deformed at least in one place, said clamping members being sufficiently connected with said fasteners as to prevent rotation relatively to each other at least to the extent that, when said fasteners are rotated, said clamping members rotate in said undercut slot from an initial position and a locking position is ensured, whereby said attachments and said clamping means secured to them by said fasteners form an assembly unit which is secured as a whole on said shaped parts.

4. Securing means in accordance with claim 3, characterized in that said tensioning screws are provided with a tip extending beyond the thread.

5. Securing means for securing structural attachments to shaped parts of metal or plastic, particularly shaped frames of doors or windows having undercut slots providing undercut walls spaced apart by an aperture slot, comprising:

clamping members whose length is greater than their width, inserted into said slots and engaging under surfaces of said undercut walls, said clamping members being narrower in width than said aperture slot and shorter in length than the undercut portion of said slots, and fasteners for connecting said attachments and said clamping members, said fasteners being rotatably anchored to said attachments, said fasteners being non-circular in shape and being inserted into correspondingly shaped openings through said clamping members, said fasteners and clamping members being riveted together, said clamping members being sufficiently connected with said fasteners as to prevent rotation relatively to each other at least to the extent that, when said fasteners are rotated, said clamping members rotate in said undercut slot from an initial position and a locking position is ensured, whereby said attachments and said clamping means secured to them by said fasteners form an assembly unit which is secured as a whole on said shaped parts.

6. Securing means in accordance with claim 5, characterized in that said fasteners have longitudinal ribs and said through openings have corresponding lateral groove-like recesses.

7. Securing means for securing structural attachments to shaped parts of metal or plastic, particularly shaped frames of doors or windows having undercut slots providing undercut walls spaced apart by an aperture slot, comprising:

clamping members whose length is greater than their width, inserted into said slots and engaging under surfaces of said undercut walls, said clamping members being narrower in width than said aperture slot and shorter in length than the undercut portion of said slots, and fasteners for connecting said attachments and said clamping members, said fasteners being rotatably anchored to said attachments, said fasteners being provided with a head at one end and said attachments having open slots at one end whose width is adapted to receive said fastener and is less than the diameter of said head, said clamping members being sufficiently connected with said fasteners as to prevent rotation relatively to each other at least to the extent that, when said fasteners are rotated, said clamping members rotate in said undercut slot from an initial position and a locking position is ensured, whereby said attachments and said clamping means secured to them by said fasteners form an assembly unit which is secured as a whole on said shaped parts.

8. Securing means in accordance with claim 7, characterized in that said slots are provided with a countersink for said head.

9. Securing means for securing structural attachments to shaped parts of metal or plastic, particularly shaped frames of doors or windows having undercut slots providing undercut walls spaced apart by an aperture slot, comprising:

clamping members whose length is greater than their width, inserted into said slots and engaging under surfaces of said undercut walls, said clamping members being narrower in width than said aperture slot and shorter in length than the undercut portion of said slots, said clamping members being substantially rectangular, with two sides shorter than the other two sides, being rounded off at two diagonally opposed corners, the spacing of said rounded-off corners from each other being somewhat smaller than the width of the undercut slot, each said clamping member having a ramp on each of its two shorter sides on their upper rim, each said ramp starting from a rounded corner and rising toward the corresponding other corner, the upper portion of each ramp having corrugations, and fasteners for connecting said attachments and said clamping members, said fasteners being rotatably anchored to said attachments, said clamping members being sufficiently connected with said fasteners as to prevent rotation relatively to each other at least to the extent that, when said fasteners are rotated, said clamping members rotate in said undercut slot from an initial position and a locking position is ensured, whereby said attachments and said clamping means secured to them by said fasteners form an assembly unit which is secured as a whole on said shaped parts.

* * * * *